UNITED STATES PATENT OFFICE.

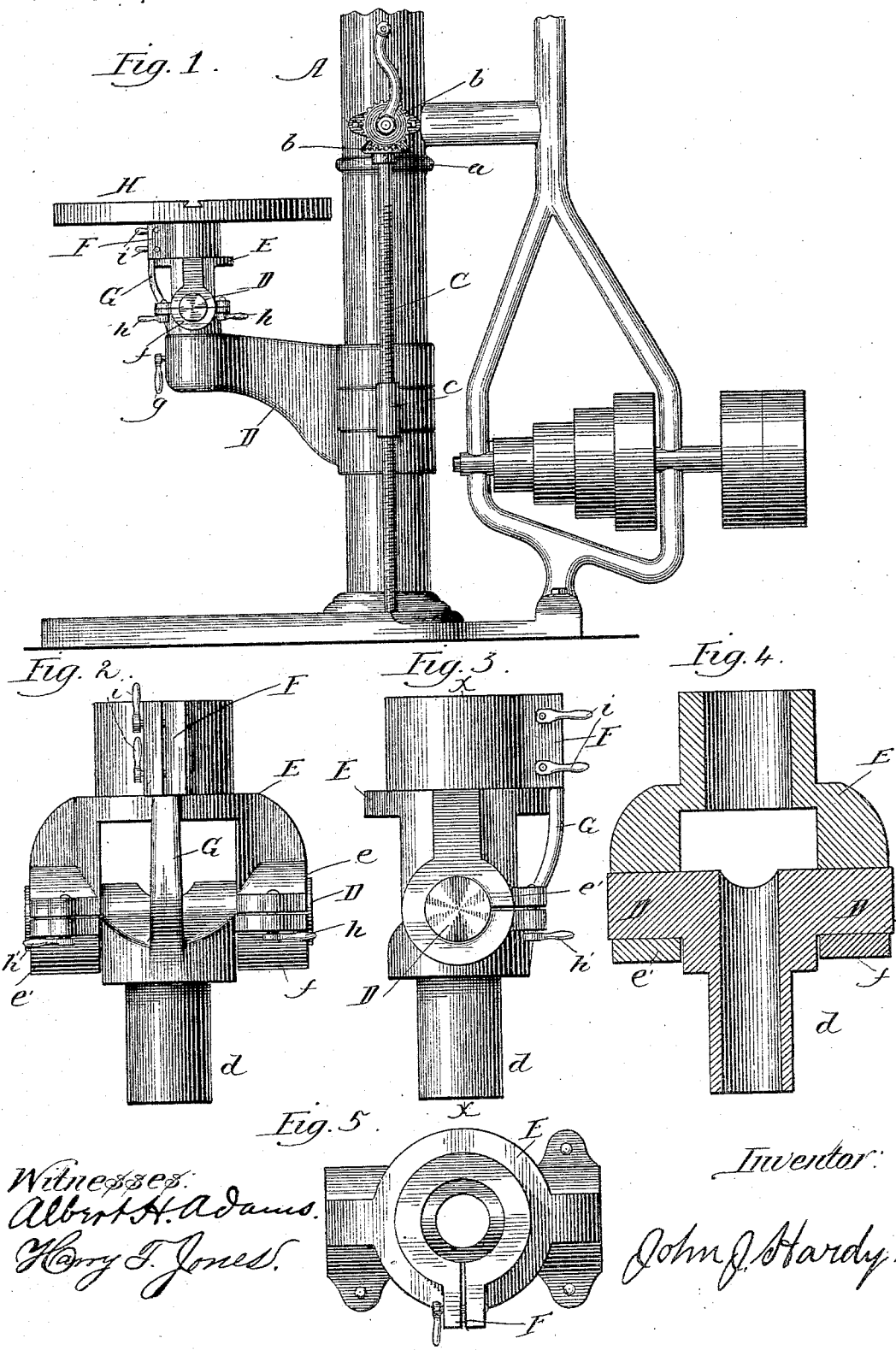

JOHN J. HARDY, OF LAKE VIEW, ILLINOIS, ASSIGNOR TO HIMSELF, LEWIS W. HARDY, OF SAME PLACE, AND JOHN A. YALE, JOSEPH E. YOUNG, AND DAVID L. HOUGH, ALL OF CHICAGO, ILLINOIS.

UNIVERSAL TABLE FOR DRILLS.

SPECIFICATION forming part of Letters Patent No. 380,322, dated April 3, 1888.

Application filed January 30, 1888. Serial No. 262,356. (No model.)

*To all whom it may concern:*

Be it known that I, JOHN J. HARDY, residing at Lake View, in the county of Cook and State of Illinois, and a citizen of the United States, have invented a new and useful Improvement in Universal Tables for Drills, of which the following is a specification, reference being had to the accompanying drawings, in which—

Figure 1 is a side elevation showing so much of a vertical drill as is necessary to illustrate my invention. Fig. 2 is a front elevation of the table for the chuck. Fig. 3 is a side elevation of the same parts. Fig. 4 is a cross-section on line $x\ x$ of Fig. 3. Fig. 5 is a plan view of the parts shown in Figs. 2 and 3.

This invention relates to vertical drills, and has for its object to construct a table for the chuck or face-plate of the drill which can be adjusted vertically, and which will allow the chuck or face-plate to be rotated on a vertical axis and tilted on a horizontal axis, so that the piece to be drilled can be rotated beneath the drill or be turned at any desired angle. Its nature consists in the several parts and combination of parts hereinafter described and claimed as new.

In the drawings, A represents the standard or upright support of a vertical drill.

B is the bracket or arm which supports the table of the chuck or face-plate from the standard A.

C is a screw-threaded rod for adjusting the bracket or arm B vertically.

D is a trunnion.

E is the head-stock of the table.

F is a clamping-collar.

G is a stop.

H is the chuck or face plate.

$a$ is a collar on the standard A, through which the rod C passes.

$b$ are bevel-wheels.

$c$ is a screw-threaded ear or lug on the bracket or arm B, with which the screw-threaded rod coacts.

$d$ is the spindle of the trunnion D.

$e\ e'$ are bearings in the head-stock E for the trunnion D.

$f$ is a cap.

$g\ h\ h'\ i$ are set-screws or handles.

The bracket or arm B is adjusted vertically on the standard A by the screw-threaded rod C, which, being rotated by means of the bevel-wheels $b$ in the screw-threaded ear or lug $c$, slides the bracket or arm B vertically on the standard A, as desired. One side of the trunnion D is inserted in the clamping-bearing $e'$ of the head-stock E and the other side of the trunnion is inserted in the bearing $e$, and the cap $f$ is placed over the trunnion and secured by the set-screws or handles $h$. The spindle $d$ of the trunnion D is then inserted in a circular socket in the end of the arm or bracket B, as shown in Fig. 1, where it can be rotated to any desired position, and secured by the set-screw or handle $g$. The upper end of the head-stock has formed therewith or secured thereto a clamping-collar, F, in which the spindle of the chuck or face-plate H is inserted, which permits the chuck or face-plate to be rotated on its spindle and secured in any position by the set-screw or handle $i$, which clamps the collar F around the spindle of the chuck or face-plate H.

The head-stock E, carrying the chuck or face-plate H, can be tilted forward on its trunnion D, so that the plane of the chuck H will form any desired angle with the vertical drill, (not shown,) and when the chuck or face-plate is at the required angle it can be secured in that position by means of the clamping-bearing $e'$, with its set-screw or handle $h'$, and the clamping-cap $f$ on the bearing $e$, with its set-screws or handles $h$. When the head-stock E is tilted back to bring the chuck or face-plate into a horizontal plane, the stop G on the trunnion D will strike against the collar F, thereby securing a perfectly horizontal adjustment of the chuck H and also giving a firmer support. This stop G can be attached to the collar or head-stock and made to strike against the trunnion, if so desired.

By this construction of table for a vertical drill the chuck or face-plate carrying the piece to be drilled can be rotated on its vertical axis to any desired position and firmly and easily clamped in that position. It can also be tilted on its horizontal axis, so that the article on the chuck or face-plate can be drilled at an angle and the chuck firmly clamped in that position; and when the chuck or face-plate is thus set at an angle the entire table can be rotated on the spindle $d$ as a vertical axis without interfering with the other adjustments of the chuck and clamped firmly in any position.

By this construction and arrangement circular rows of holes can be drilled either vertically or at angles inclined toward or away from the center, and single holes or straight rows of holes may be drilled at right angles or at angles varying therefrom in any degree desired.

What I claim as new, and desire to secure by Letters Patent, is—

1. In a drill-table, the combination of the chuck or face-plate H with the head-stock E, having the clamping-collar F and adapted to be tilted on a trunnion, D, substantially as and for the purpose specified.

2. In a drill-table, the head-stock E, carrying a chuck or face-plate, H, in combination with the trunnion D and stop G, substantially as and for the purposes specified.

3. In a drill-table, the chuck or face-plate H, carried by the head-stock E, trunnion D, with its spindle $d$, and stop G, in combination with the bracket or arm B and set-screw $g$, substantially as and for the purposes specified.

JOHN J. HARDY.

Witnesses:
ALBERT H. ADAMS,
HARRY T. JONES.